United States Patent [19]

Browning

[11] 4,029,346

[45] June 14, 1977

[54] LINE THREADER DEVICE

[76] Inventor: Charles W. Browning, 4645 E. 57th St., Tulsa, Okla. 74135

[22] Filed: Oct. 14, 1975

[21] Appl. No.: 622,036

[52] U.S. Cl. .............................................. 289/17
[51] Int. Cl.[2] .......................................... D03J 3/00
[58] Field of Search ................. 289/17; 81/43, 418, 81/419, 425 R, 425 A; 7/5.5; 269/254 R

[56] References Cited

UNITED STATES PATENTS

| 790,500 | 5/1905 | Harper | 81/419 X |
|---|---|---|---|
| 1,508,287 | 9/1924 | Moran | 81/43 |
| 2,697,624 | 12/1954 | Thomas et al. | 289/17 |
| 2,961,670 | 11/1960 | Frame | 289/17 |
| 3,106,417 | 10/1963 | Clow | 289/17 |
| 3,353,819 | 11/1967 | Palmer | 289/17 |
| 3,521,918 | 7/1970 | Hammond | 289/17 |
| 3,589,369 | 6/1971 | Alksnis | 81/43 X |
| 3,881,757 | 5/1975 | Guinther | 289/17 |

Primary Examiner—Louis K. Rimrodt

[57] ABSTRACT

A device for holding a hook eyelet to enable easier threading and knotting of a fishing line through use of the said device comprising two plates, each with means to hold securely the eyelet of a lure and a fishing hook, each of the said means being shaped into similar cone shaped indentations with a slot from the center of the indentation and a threading hole in the apex of each of the said cone shaped indentations through which to thread the fishing line; the said plate surfaces being aligned to permit the two cone shaped indentations to nest together.

3 Claims, 7 Drawing Figures

LINE THREADER DEVICE

BACKGROUND OF THE INVENTION

Reference is made to my Disclosure Documents No. 23,383 and 35,976, entitled "Fishing Lure Holder and Threader" filed on Oct. 5, 1973 and on Oct. 9, 1974 in the U.S. Pat. Office, both of which discloses the concept of a fishing lure threader. The disclosure in these documents are hereby incorporated by reference. The documents describe a device incorporating the concept of holding the eyelet of a fishing hook for easy threading of the fishing line through the eyelet of a fishing lure or hook. This concept is found in my invention disclosed herein.

SUMMARY OF THE INVENTION

Fishing people have experienced difficulty in attaching lures or hooks to fishing lines, especially if the fishing line is made from a monofilament plastic material which is extremely difficult to thread through eyelets of fishing lures and hooks. The device which I shall disclose is structually suited to hold an eyelet in exact position with a guide to lead the fishing line through the eyelet.

The structure of the LINE THREADER DEVICE is such as to provide easy visibility for the user in threading lines through the eyelets of lures. The structure of the LINE THREADER DEVICE is such that the cone shaped indentations will aid in guiding the line through the eyelet in place in the LINE THREADER DEVICE. The invention discloses structure to enable a person to wind the line around the body of the device so as to form a knot for holding a lure or a hook to a fishing line.

OBJECTS OF THE INVENTION

The principal object of this invention is to disclose a device for holding lures and hooks while threading line through the eyelet of the said lures and hooks.

Another object of this invention is to disclose structure in the said device which will securely hold the said lure and hook eyelet.

And still another object of this invention is to furnish a device suitable for holding the eyelet of lures and hooks and form a tight knot to hold a fishing lure and hook to a fishing line.

Still another object of this invention is to disclose structure in a device suitable for tying a fishing line into a tightly secured knot with means to clip the excessive line from the knot which holds the line and eyelet of a lure or hook together.

DESCRIPTION OF DRAWINGS

Reference is made to FIG. 1 which shows the structure of the LINE THREADER DEVICE 15 in simplest form. The structure consists of two plate surfaces, 1 and 2, each having a first end structure in the shape of a cone of sufficient size to accommodate an eyelet of a fishing hook or lure placed between the cone sections 3 and 4 of plates 1 and 2, the said eyelet resting on the inner surface of cone 4 in plate 2 and the outer surface cone 3 in plate 1 when plates 1 and 2 are placed together in approximate parallel position as shown in FIG. 4. In FIG. 2 the cross-sectional view shows more fully the shape of cones 3 and 4 located on the first end structure of plates 1 and 2 respectively. In FIG. 3 the LINE THREADER DEVICE is illustrated with a fishing lure eyelet 10 in place between the cone sections 3 and 4 as shown in FIG. 2. The first end structure of both plates 1 and 2 are recessed to allow easy access in placing the eyelet 10 of a lure 11 in position so as to pass the line 12 through the cone shaped indentation 3 and 4 and through the eyelet 10 of lure 11. FIG. 4 is a cross-sectional view of the LINE THREADER DEVICE showing the path of line 12 through cone sections 3 and 4 FIG. 5 and through the eyelet 10. FIG. 5 is a cross-sectional view showing the positioning of eyelet 10 in relationship to cones 3 and 4. In FIG. 5 slots 5 and 6 are provided for easy removal of the line 12 and eyelet 10 from the LINE THREADER DEVICE after line 12 has been threaded through eyelet 10.

FIG. 6 discloses the LINE THREADER DEVICE 9 in which plates 1 and 2 are connected by a spring body 16 riveted to plate 1 at positions 17 and 18 and at positions 19 and 20 on plate 2 so as to hold plates 1 and 2 in proper alignment as shown in FIG. 6. Attached to plate 2 at 24 is a "Z" shaped spring line holder 21 which is useful for holding the end of line 12 in position. This spring line holder 21 passes through an opening in plate 1 at 22 and in plate 2 at 23. The second end of plate 1 and 2 of the LINE THREADER DEVICE 9 is curved and sharpened into cutting edges 14 as shown in FIG. 7 which are useful for cutting segments of fishing line. The first end structure of plate 1 and 2 are shaped into similar coneshaped indentations 3 and 4 as shown in FIG. 1 and FIG. 3. FIG. 7 is another view of the LINE THREADER DEVICE as shown in FIG. 6 showing the spring line holder 21 in a raised position through hold 22 in plate 1 the utility of which shall be explained in the following paragraph.

OPERATION OF THE LINE THREADER DEVICE

Figure 1:
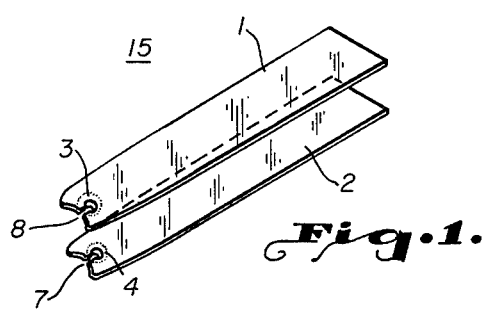
FIG. 1 is an isometrical drawing showing the two sections of the device in operating position.
Figure 5:
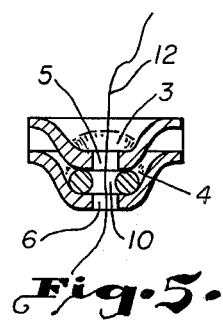
FIG. 5 is a cross-sectional front view of an eyelet of a fishing lure in place in the device.
Figure 2:
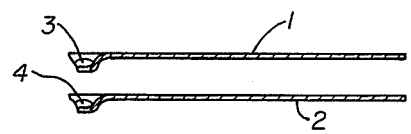
FIG. 2 is a front cross-sectional view of the device showing the relationship of the two sections in operating position.
Figure 3:
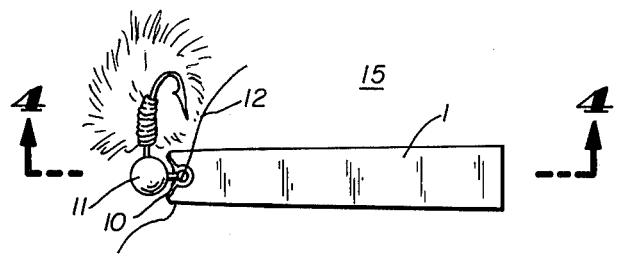
FIG. 3 is a top view of the device with the eyelet in a lure in threading position for the fishing line.
Figure 4:
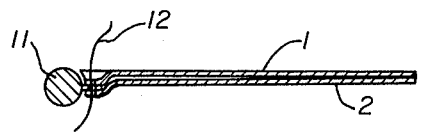
FIG. 4 is a side view of the device with the eyelet of a lure in threading position for the fishing line.
Figure 6:
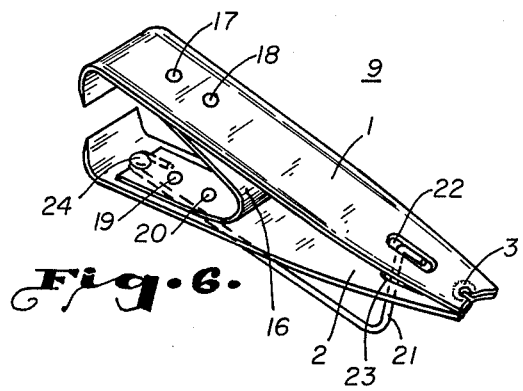
FIG. 6 is an isometrical drawing of the device showing the device with a spring clip, a cutting edge and means to hold the end of the line to form the tying knot.
Figure 7:
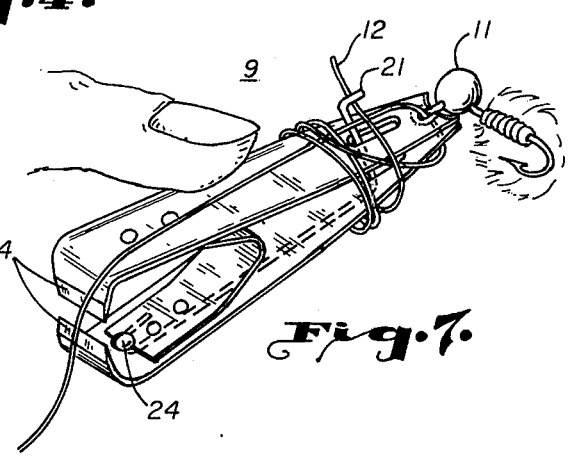
FIG. 7 is an isometrical drawing showing FIG. 6 with the line holding means in an open position.

Reference is made to FIG. 6 which shows the line threader 15 FIG. 3 modified to included other features. To operate the device 9 plate 1 and 2 are each depressed to allow for insertion of eyelet 10 in lure 11 between cone shaped indentations 3 and 4 FIG. 5 on plates 1 and 2. Eyelet 10 of a fishing hook or lure is then placed between cone sections 3 and 4 as shown in FIGS. 3 and 5. The finger pressure on plates 1 and 2 is released and plates 1 and 2, FIG. 6, return to the original position as shown in FIG. 7. Eyelet 10 will remain supported in similar manner as shown in FIG. 3. The line to be attached to the lure is threaded through eyelet 10 by threading it through the cone indentations 3 and 4, FIGS. 3 and 5. Following the steps of threading the line through the cone shaped indentations 3 and 4 as shown in FIG. 5, Z-shaped spring line holder 21 is raised by finger pressure on plate 2, (Note FIG. 7), the Z-shaped spring line holder 21 projects through the opening FIG. 6 above plate 1 as shown in FIG. 7. The line end is held in position on plate 1 drawn through eyelet 12 as shown in FIG. 3 and is held by a thumb on the top surface of plate 1.

The line 12 which has been drawn through eyelet 4, FIG. 5 is looped over plates 1 and 2 FIG. 6 a selected number of times as shown in FIG. 7 and rest behind spring line holder 21 which is in a raised position. Fishing line 12 is lead in front of spring line holder 21 and then spring line holder 21 is released to return to position as shown in FIG. 6 to retain the fishing line 12. The eyelet 10 in the lure 11, FIG. 3 is removed from the device 9 with line 12 through eyelet 10. The line 12 is pulled tightly to form a knot which holds the lure tightly to the fishing line 12. The excessive line from the formed knot is cut by cutting edges 14 in FIG. 7.

It is my intention to include within the preview of my disclosure such modification which would be obvious to carry out the spirit of this invention as fall within the terms or spirit of the following claims:

I claim:
1. A line threading device for attaching lines to fishing lures comprising
   a. A first and a second plate
      1. The said first and second plate, each having a cone-shaped indentation extending downwardly from the upper surface of each of the said plates at a first end of each of said plates, the said cone-shaped indentations in each plate nesting each with each other so as to firmly hold the eyelet of a fishing lure and
      2. Each of the said cone-shaped indentations having a hole in the apex of the said indentations for easy threading of a fish line through the said eyelet of the said fishing lure;
   b. The said first and second plate being connected together by a spring clip;
      1. The said spring clip extending from the lower surface of a first said plate to the upper surface of the said second plate so as to provide proper alignment at the said first end of the said first and second plates when the said plates are in a closed position;
   c. The said second plate having a Z-shaped spring line holder mounted on the lower surface of the said second plate and extending through an opening in the said first and second plates to the upper surface of the first said plate.
2. The line threader device as claimed in claim 1 wherein the outer edge of the first said end of each of said first and second plate has a curved surface.
3. The line threader device as claimed in claim 2 wherein the second end structure of the said first and second plates are curved inwardly toward each other and each of the said end structures are shaped and form a cutting edge.

* * * * *